UNITED STATES PATENT OFFICE.

WILHELM GERBEL, OF RORSCHACH, ST. GALL, SWITZERLAND.

PREPARING FLOUR FROM CURD OF MILK.

SPECIFICATION forming part of Letters Patent No. 411,717, dated September 24, 1889.

Application filed January 31, 1889. Serial No. 298,259. (No specimens.)

*To all whom it may concern:*

Be it known that I, WILHELM GERBEL, a citizen of Switzerland, residing at Rorschach, in the canton of St. Gall, in the Republic of Switzerland, have invented new and useful Improvements in the Production of Milk-Flour from Curd, of which the following is a specification.

This invention relates to the manufacture of a new product which has the form of flour and is produced from curd.

In carrying out my invention I remove the cream from sweet milk, treat the remaining liquid with rennet, and then separate the whey, as usually practiced in the manufacture of cheese. The separation of the curd from the whey can be effected by pressure or by means of a centrifugal machine, and after the curd has been freed from the whey it is comminuted by means of suitable knives or cutters and the comminuted mass is spread upon trays or hurdles, which are best made of sheet metal. The trays which contain the comminuted curd are then introduced into a kiln similar to those used for drying fruit, in which a uniform temperature of from 40° to 50° centigrade is maintained, and in which the comminuted curd is kept for about six hours, during which time it is repeatedly turned over. After the lapse of about six hours the mass is left to cool for from six to nine hours, and then again exposed to a temperature of from 40° to 50° centigrade for about six hours and then again left to cool, the same process being repeated until the mass is sufficiently dry and crisp, so that it can be reduced to a fine powder by grinding or other suitable means. If the product is intended for home use, it is sufficient to expose the comminuted curd three times in succession to the process of heating and cooling, as above stated; but if the product is intended for export or for use on ships, it is best to repeat the heating and cooling process four or five times.

The operation of comminuting the dried mass can be effected by an ordinary grinding-mill.

The curd-flour which is the result of the foregoing process retains its inherent nourishing properties and its durability, and it remains inert until it is brought into the proper condition for raising its vitality, which is done, for instance, when it is mixed into a dough. For this reason the air-tight integuments needed for the preservation of similar products which are obtained by exposing milk to a high temperature *in vacuo* are not required for my curd-flour.

My flour can be used with great advantage for bread or other articles of a similar nature, and for this purpose I mix it with wheat or other flour in the proportion of about one-fourth to one-half part of curd-flour to three-fourths to one-half part of ordinary flour.

What I claim as new, and desire to secure by Letters Patent, is—

The process hereinbefore set forth for preparing a flour from curd, said process consisting in curdling milk, separating the curd from the whey, comminuting the curd, exposing the same repeatedly to alternate heating and cooling processes, and then grinding the curd, substantially as described.

In testimony whereof I have hereunto set my hand and seal in the presence of two subscribing witnesses.

WILHELM GERBEL. [L. S.]

Witnesses:
  CR. NYRING,
  K. ZEIGLER.